US 12,504,927 B2

United States Patent
Brock-Petersen et al.

(10) Patent No.: US 12,504,927 B2
(45) Date of Patent: Dec. 23, 2025

(54) INTERNAL LOG MANAGEMENT IN MEMORY SYSTEMS

(71) Applicant: MICRON TECHNOLOGY, INC., Boise, ID (US)

(72) Inventors: Kyle Brock-Petersen, Boulder, CO (US); Scheheresade Virani, Frisco, TX (US); Steven Gaskill, Campbell, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/591,692

(22) Filed: Feb. 29, 2024

(65) Prior Publication Data

US 2024/0311288 A1    Sep. 19, 2024

Related U.S. Application Data

(60) Provisional application No. 63/452,968, filed on Mar. 17, 2023.

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 12/023* (2013.01)

(58) Field of Classification Search
None
See application file for complete search history.

(56) References Cited

U.S. PATENT DOCUMENTS

| | | | |
|---|---|---|---|
| 5,249,148 A * | 9/1993 | Catherwood | G06F 9/3552 712/E9.043 |
| 2006/0023526 A1 * | 2/2006 | Takahashi | G11C 29/56012 365/201 |
| 2022/0100844 A1 * | 3/2022 | Dinsmore | G06F 21/52 |

* cited by examiner

*Primary Examiner* — Daniel D Tsui
(74) *Attorney, Agent, or Firm* — Lowenstein Sandler LLP

(57) ABSTRACT

Described are systems and methods for internal log management in memory sub-systems. An example memory sub-system comprises a controller managing one or more memory devices. The controller is configured to perform operations, comprising: maintaining a write pointer referencing a next data item position within a log buffer residing on a memory device of the one or more memory devices; maintaining a log retrieval pointer referencing a data retrieval position within the log buffer; storing, at a log buffer position specified by the write pointer, a data item reflecting a state of the system; advancing the write pointer by a size of the data item; responsive to determining that the write pointer exceeds an end of the log buffer, wrapping the write pointer around the end of the log buffer; responsive to receiving, from a host, a log retrieval request, retrieving the log data starting from the position within the log buffer referenced by the log retrieval pointer; transmitting the retrieved log data to the host; advancing the log retrieval pointer by a size of the retrieved log data; responsive to determining that the log retrieval pointer exceeds the end of the log buffer, wrapping the log retrieval pointer around the end of the log buffer.

17 Claims, 11 Drawing Sheets

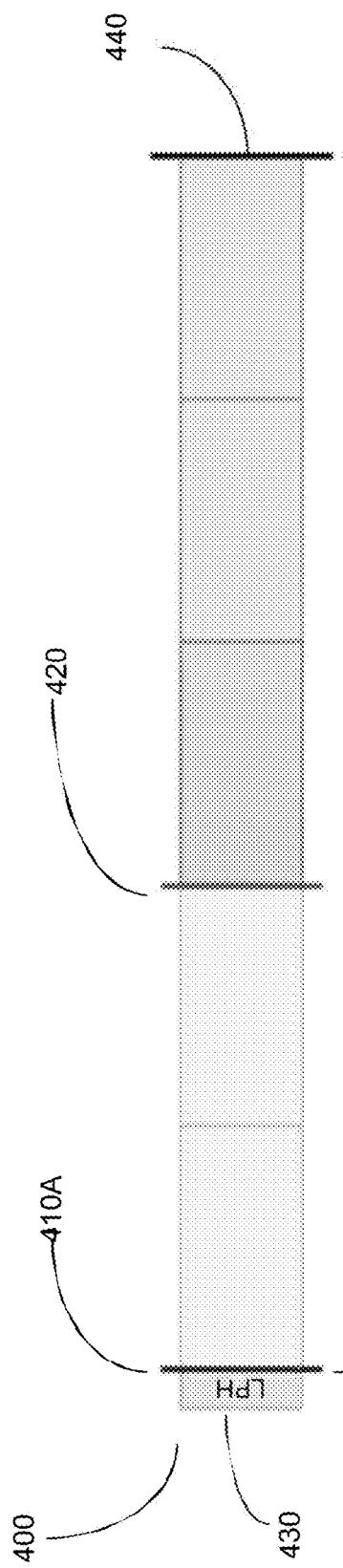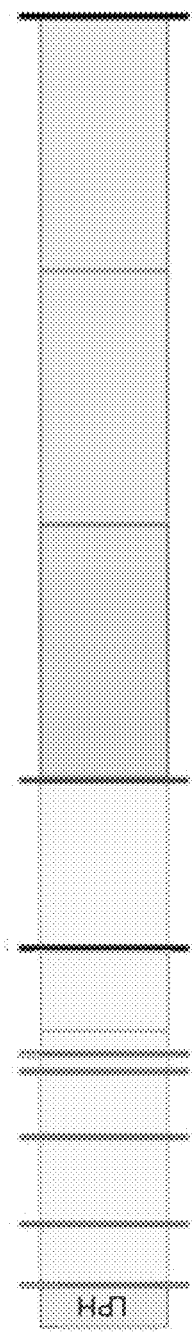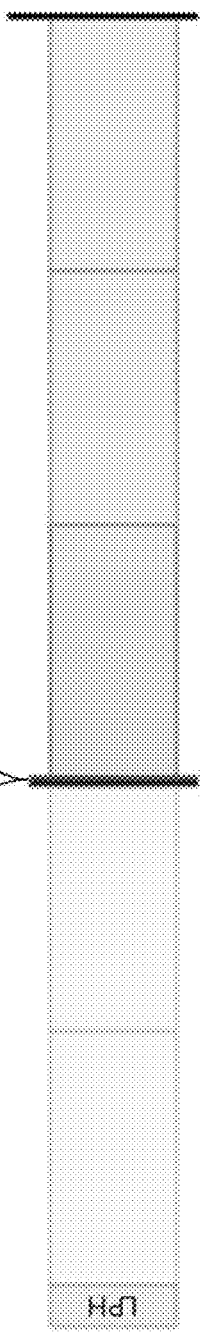

INTERNAL LOG MANAGEMENT IN MEMORY SYSTEMS

REFERENCE TO RELATED APPLICATIONS

This application claims the priority benefit of U.S. Provisional Application No. 63/452,968, filed Mar. 17, 2023, which is incorporated by reference herein.

TECHNICAL FIELD

Embodiments of the disclosure relate generally to memory sub-systems, and more specifically, to internal log management in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 4A-4C schematically illustrate the pointers maintained by the memory controller in order to facilitate opportunistic log retrieval at the host-defined cadence and using the host-defined data transfer size implemented in accordance with aspects of the present disclosure;

DETAILED DESCRIPTION

Figure 1:
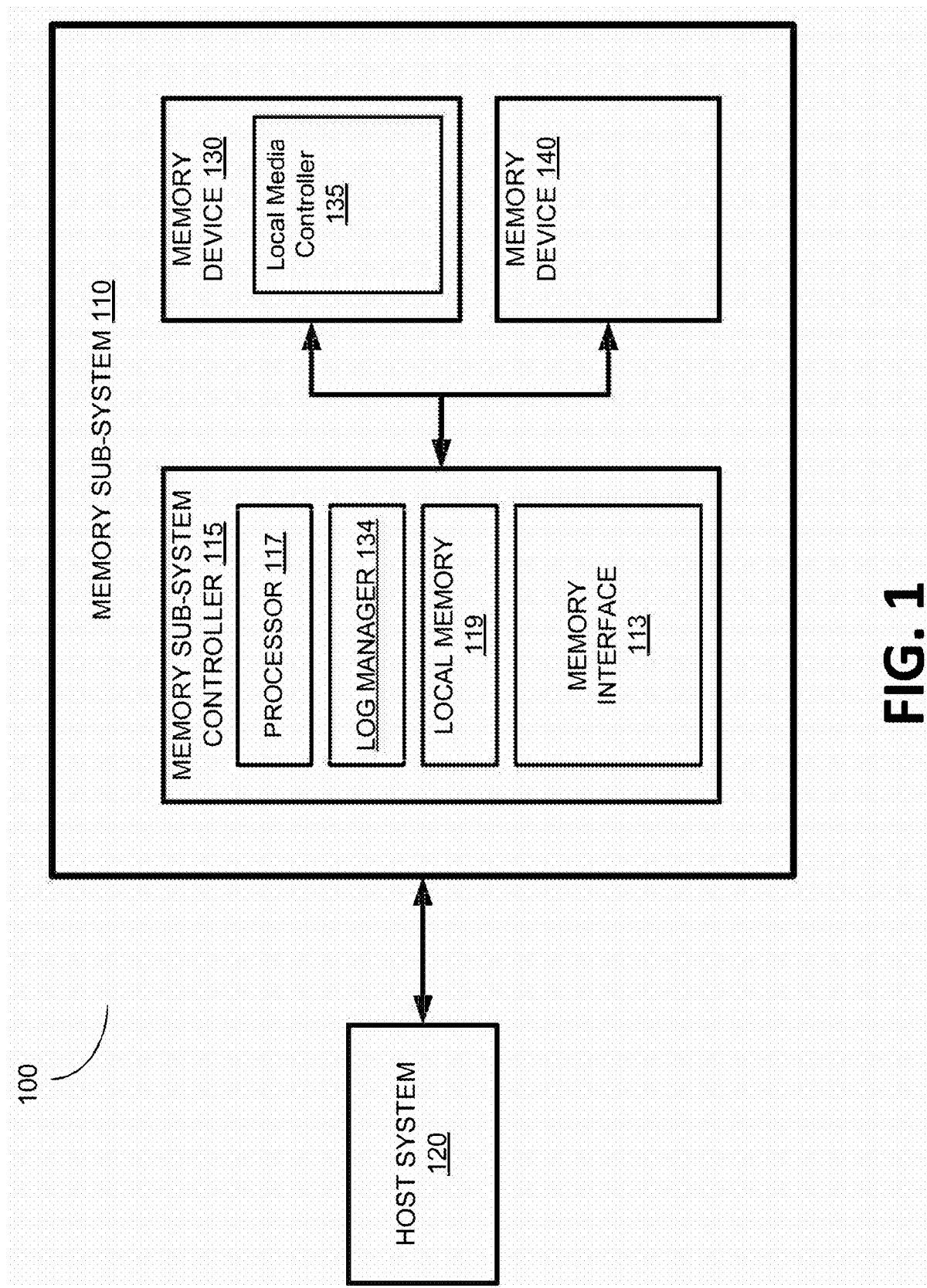
FIG. 1 illustrates an example computing system that includes a memory sub-system in accordance with one or more aspects of the present disclosure.

Aspects of the present disclosure are directed to internal log management operations in memory systems. A memory sub-system can include one or more storage devices, memory modules, or a combination of storage devices and memory modules. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, a memory sub-system may be represented by a solid-state drive (SSD), which may include one or more non-volatile memory devices. In some embodiments, the non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. A "block" can refer to a unit of the memory device used to store data and can include a group of memory cells. An example of a "block" is an "erasable block," which is the minimal erasable unit of memory, while "page" is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell can be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Depending on the cell type, each memory cell can store one or more bits of binary information and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells.

Memory access operations (e.g., a programming (write) operation, an erase operation, etc.) can be executed with respect to sets of the memory cells, e.g., in response to receiving memory access commands from the host. A memory access operation can specify the requested memory access operation (e.g., write, erase, read, etc.) and a logical address, which the memory sub-system would translate to a physical address identifying a set of memory cells (e.g., a block).

In operation, memory sub-systems, such as solid state drives (SSD), may exhibit various failures, which can be attributed to their underlying technological features, design features, production variations, and/or various other factors. Such failures may include, e.g., media failures (e.g., due to media wear), failures of other hardware (e.g., power management circuits), and/or firmware errors.

In order to facilitate the device health monitoring and failure diagnostics, a memory sub-system controller may maintain one or more logs. In some implementations, the logs are stored on one or more memory devices and may be retrieved via the host interface. Information stored by such logs may include, e.g., error messages, event data, media endurance data, other device health data, etc.

In some implementations, the logs may be retrieved from the memory sub-system in response to host-initiated commands. In various illustrative examples, the log retrieval may be performed periodically and/or upon detecting a memory sub-system failure or inadequate performance; the host may then transmit the retrieved logs to the vendor or original equipment manufacturer (OEM) of the memory sub-system.

However, retrieving the logs would require the memory sub-system to perform a sequence of media read operations and thus may adversely affect the memory sub-system latency and/or other quality of service (QOS) requirements. Furthermore, frequent log retrieval can result in redundant log data being retrieved, transmitted, and stored in the log analysis pipeline.

Implementations of the present disclosure alleviate the above-referenced and other deficiencies by implementing an efficient log management strategy that facilitates opportunistic log retrieval at the host-defined cadence and using the host-defined data transfer size, as described in more detail herein below.

Various aspects of the methods and systems are described herein by way of examples, rather than by way of limitation. The systems and methods described herein can be implemented by hardware (e.g., general purpose and/or specialized processing devices, and/or other devices and associated circuitry), software (e.g., instructions executable by a processing device), or a combination thereof.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 ("controller") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc.

The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In one embodiment, the memory sub-system controller 115 includes a log manager 134 employed to perform log management operations, as described in more detail herein below. In some embodiments, at least part of the functionality of the log manager 134 can be performed by the local media controller 135. In some embodiments, log manager 134 is implemented by firmware, hardware components, or a combination of the above.

Figure 2:
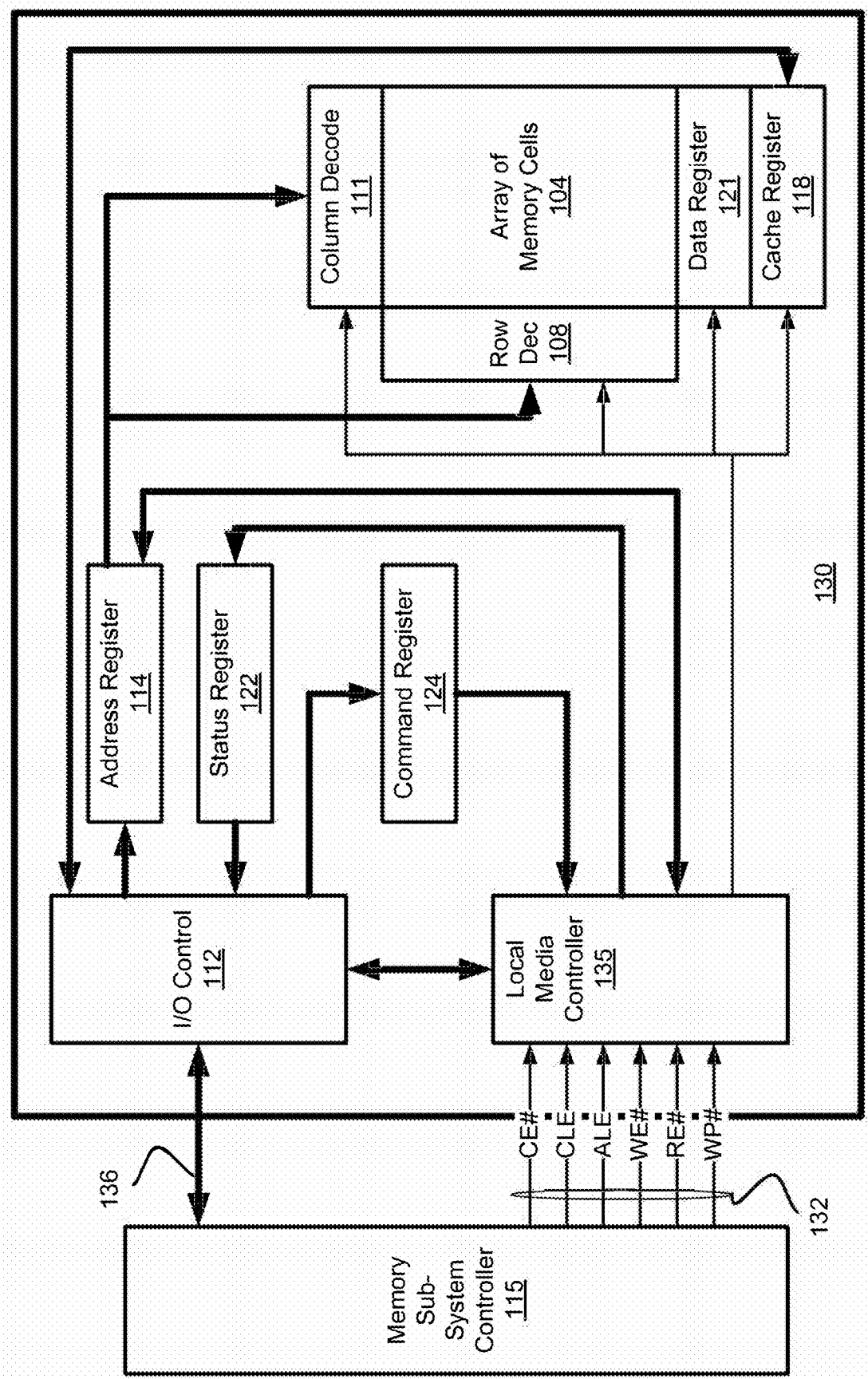
FIG. 2 is a block diagram of a memory device in communication with a memory sub-system controller of a memory sub-system, in accordance with one or more aspects of the present disclosure.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 2) of at least a portion of array of memory cells 104 are capable of being programmed to one of at least two target data states.

Row decode circuitry 108 and column decode circuitry 111 are provided to decode address signals. Address signals are received and decoded to access the array of memory cells 204. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 204. The local media controller 135 is in communication with row decode circuitry 108 and column decode circuitry 111 to control the row decode circuitry 108 and column decode circuitry 111 in response to the addresses.

The local media controller 135 is also in communication with a cache register 218. Cache register 118 latches data, either incoming or outgoing, as directed by the local media controller 135 to temporarily store data while the array of memory cells 104 is busy writing or reading, respectively, other data. During a programming operation (e.g., a write operation), data can be passed from the cache register 118 to the data register 121 for transfer to the array of memory cells 204; then new data can be latched in the cache register 118 from the I/O control circuitry 212. During a read operation, data can be passed from the cache register 118 to the I/O control circuitry 112 for output to the memory sub-system controller 115; then new data can be passed from the data register 121 to the cache register 218. The cache register 118 and/or the data register 121 can form (e.g., can form a portion of) a page buffer of the memory device 130. A page buffer can further include sensing devices (not shown in FIG. 2) to sense a data state of a memory cell of the array of memory cells 204, e.g., by sensing a state of a data line connected to that memory cell. A status register 122 can be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands can be received over input/output (I/O) pins [7:0] of I/O bus 136 at I/O control circuitry 112 and can then be written into command register 224. The addresses can be received over input/output (I/O) pins [7:0] of I/O bus 136 at I/O control circuitry 112 and can then be written into address register 214. The data can be received over input/output (I/O) pins [7:0] for an 8-bit device or input/output (I/O) pins [15:0] for a 16-bit device at I/O control circuitry 112 and then can be written into cache register 218. The data can be subsequently written into data register 121 for programming the array of memory cells 204.

In an embodiment, cache register 118 can be omitted, and the data can be written directly into data register 220. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

In some implementations, additional circuitry and signals can be provided, and that the memory device 130 of FIG. 2 has been simplified. It should be recognized that the functionality of the various block components described with reference to FIG. 2 can not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) can be used in the various embodiments.

Figure 3:
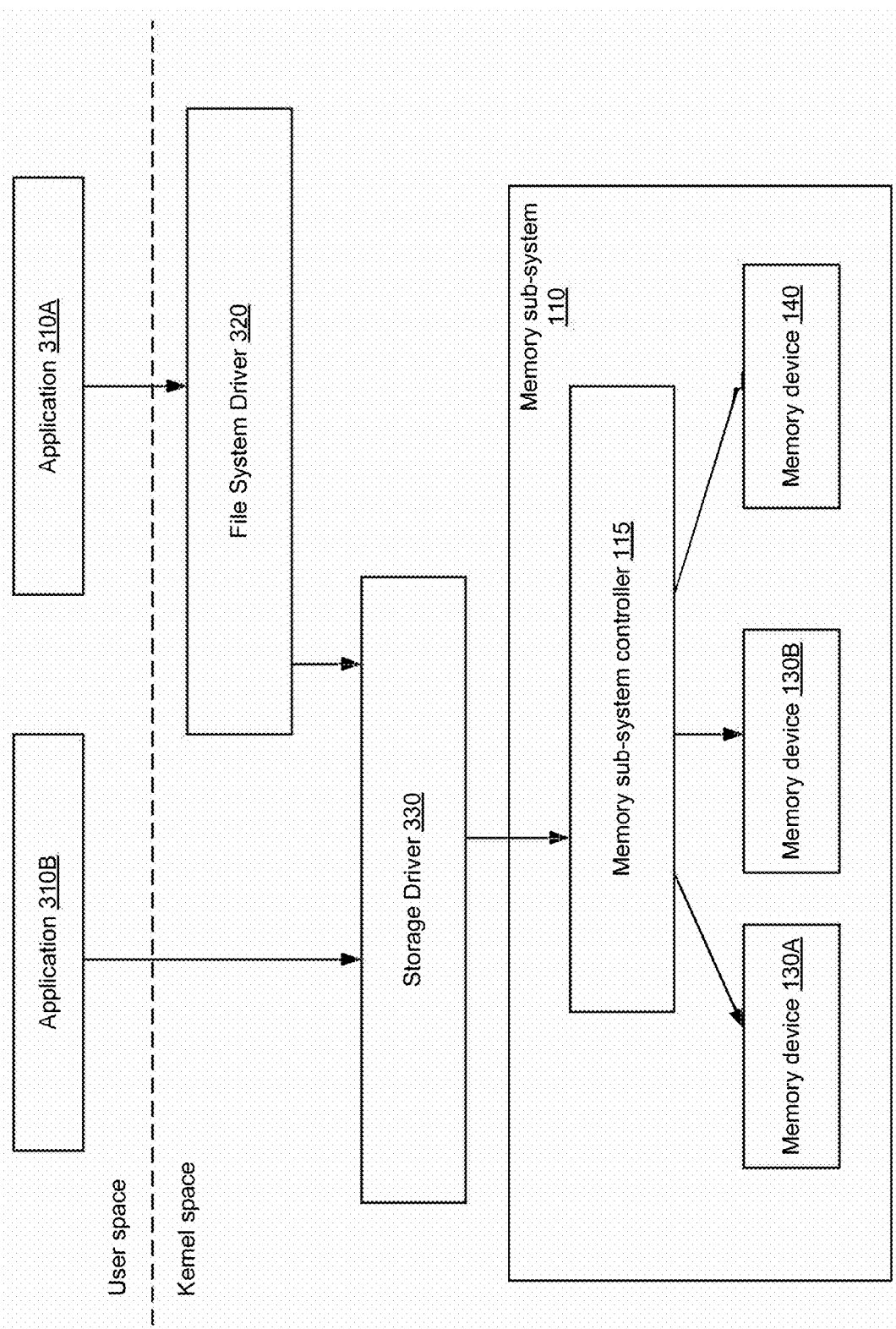
FIG. 3 schematically illustrates a programming architecture implemented by a host system in communication with a memory sub-system controller operating in accordance with one or more aspects of the present disclosure.

FIG. 3 schematically illustrates a programming architecture implemented by the host system 120 in communication with the memory sub-system controller 115 managing one or more memory devices 130, in accordance with one or more aspects of the present disclosure. As schematically illustrated by FIG. 3, the host system may run one or more applications 310A-310B. In an illustrative example, the application 310A may be in communication with the file system driver 320, which may be running in the kernel space of the host system 120 and may be employed for processing certain system calls, such as read and write calls initiated by one or more applications 310, including the application 310A, running in the user space of the host system 120. The file system driver 320 may be employed to translate the read, write, and other system calls issued by the application 310A into low-level application programming interface (API) calls to the storage driver 330, which, in turn may communicate to the memory sub-system controller 115. The storage driver 330 may be running in the kernel mode of the host system and may be employed to process API calls issued by the file system driver 320 and/or system calls issued by the application 310B into storage interface commands to be processed by the storage the memory sub-system controller 115.

In some implementations, the storage driver 330 may implement a block storage model, in which the data is grouped into blocks of one or more pre-defined sizes and is addressable by a block number. The block storage model may implement "read" and "write" command for storing and retrieving blocks of data. In an illustrative example, the storage driver 330 may implement a key-value storage model, in which the data is represented by the "value" component of a key-value pair is addressable by the "key" component of the key-value pair. The key value storage model may implement "put and get" commands, which are functionally similar to the "write" and "read" commands of the block storage model. Thus, the term "data item" as used herein may refer to a data block or to a key-value pair.

In some implementations, the file system driver 320 and/or the storage driver 330 may support I/O control commands for retrieving the logs maintained by the log manager 134 of the memory-subsystem 110.

As noted herein above, the log manager 134 may maintain one or more logs, which may be stored on one or more memory devices and retrieved via the host interface. Information stored by such logs may include, e.g., error messages, event data, media endurance data, other device health data, etc. In some implementations, a log may be maintained in a volatile memory and may be periodically flushed to a non-volatile memory device.

FIGS. 4A-4C schematically illustrate the pointers maintained by the memory controller in order to facilitate opportunistic log retrieval at the host-defined cadence and using the host-defined data transfer size implemented in accordance with aspects of the present disclosure. As schematically illustrated by FIG. 4A, the host-initiated log retrieval may be facilitated by the log manager 134 maintaining two pointers for each log 400: the retrieval pointer 410 (several consecutive pointers 410A-410N are shown in FIG. 4B) referencing the position in the log buffer from which the next host-initiated log retrieval operation should start and the write pointer 420 referencing the position in the log buffer to which the next log data should be written. Both pointers 410 and 420, together with other log metadata, may be stored in the log page header 430 of the corresponding log.

Each host-initiated log retrieval operation advances the retrieval pointer, which is initialized to the value 410A that is equal to the log page header size, to subsequent values 410B-410K until the retrieval pointer would reach the value 410N matching the write pointer 420 referencing the position in the log buffer to which the next log data should be written, as shown in FIG. 4C.

Figure 5A:
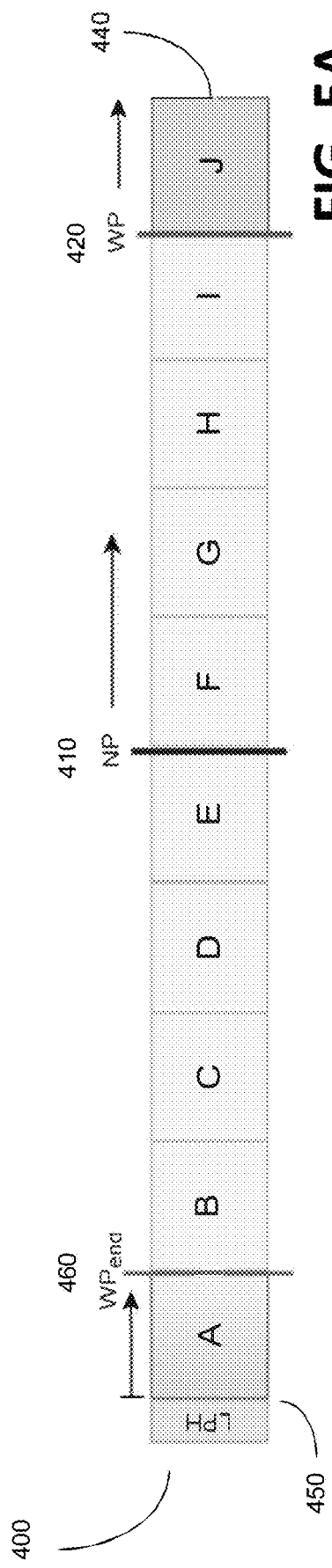
FIGS. 5A-5C schematically illustrate example circular logs implemented in accordance with aspects of the present disclosure.
Figure 5B:
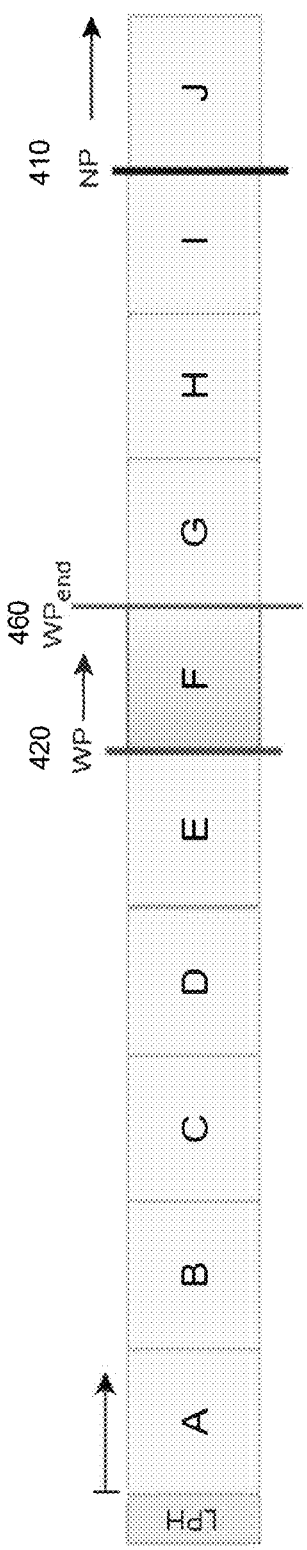
Figure 5C:
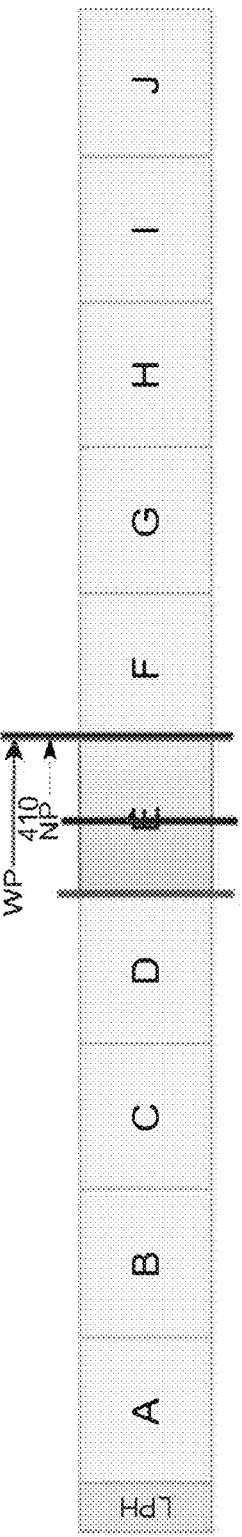

FIGS. 5A-5C schematically illustrate example circular logs implemented in accordance with aspects of the present disclosure. As shown in FIG. 5A, the log 400 may be organized in a circular manner, by wrapping around a predefined log buffer end 440, such that upon reaching the log buffer end 440, a pointer (such as the write pointer (WP) 420 or the retrieval pointer (NP) 410) would be reset to the initial value 450, which is offset by the size of the log page header 430 from the beginning of the log buffer (e.g., a memory buffer or a file). For example, the write pointer (WP) 420 may wrap around the log end 440, thus resulting in the new write pointer (WPend) 460.

As schematically illustrated by FIG. 5B, if the data logging rate (i.e., the rate of advancing the write pointer (WP) 420 to its new value (WP_end) 460) is below the rate of host-initiated log retrieval operations (i.e., the rate of advancing the retrieval pointer 410), all previously saved log data is safely retrieved by the host.

Conversely, as schematically illustrated by FIG. 5C, if the data logging rate (reflected by the rate of advancing the write pointer (WP) 420 to its new value (WP_end) 460) exceeds the rate of host-initiated log retrieval operations (reflected by the rate of advancing the retrieval pointer 410), the write pointer 420 may surpass the current log retrieval pointer 410 prior to a host-initiated log retrieval operation, such that the new value of the write pointer (WP_end) 460 in the circular log buffer would exceed the retrieval pointer 410. This would result in overwriting, by the new log data, a portion of the previously saved log data which has not yet been retrieved by the host (i.e., the log data residing between the retrieval pointer (NP) 410 and the new value of the write pointer (WP_end) 460).

Should the log data become overwritten, the log manager 134 advances the retrieval pointer 410A-410N to the new value of the write pointer (WPend) 460, thus tracking the position of the least recently written log data that is available for host-initiated retrieval. In some implementations, the log manager 134 may further report to host the amount of log space (e.g., the number of bytes) being overwritten since the last host retrieval operation. In an illustrative example, the number of overwritten bytes is equal to the difference between the wrapped-around write pointer and the retrieval pointer.

Figure 6A:
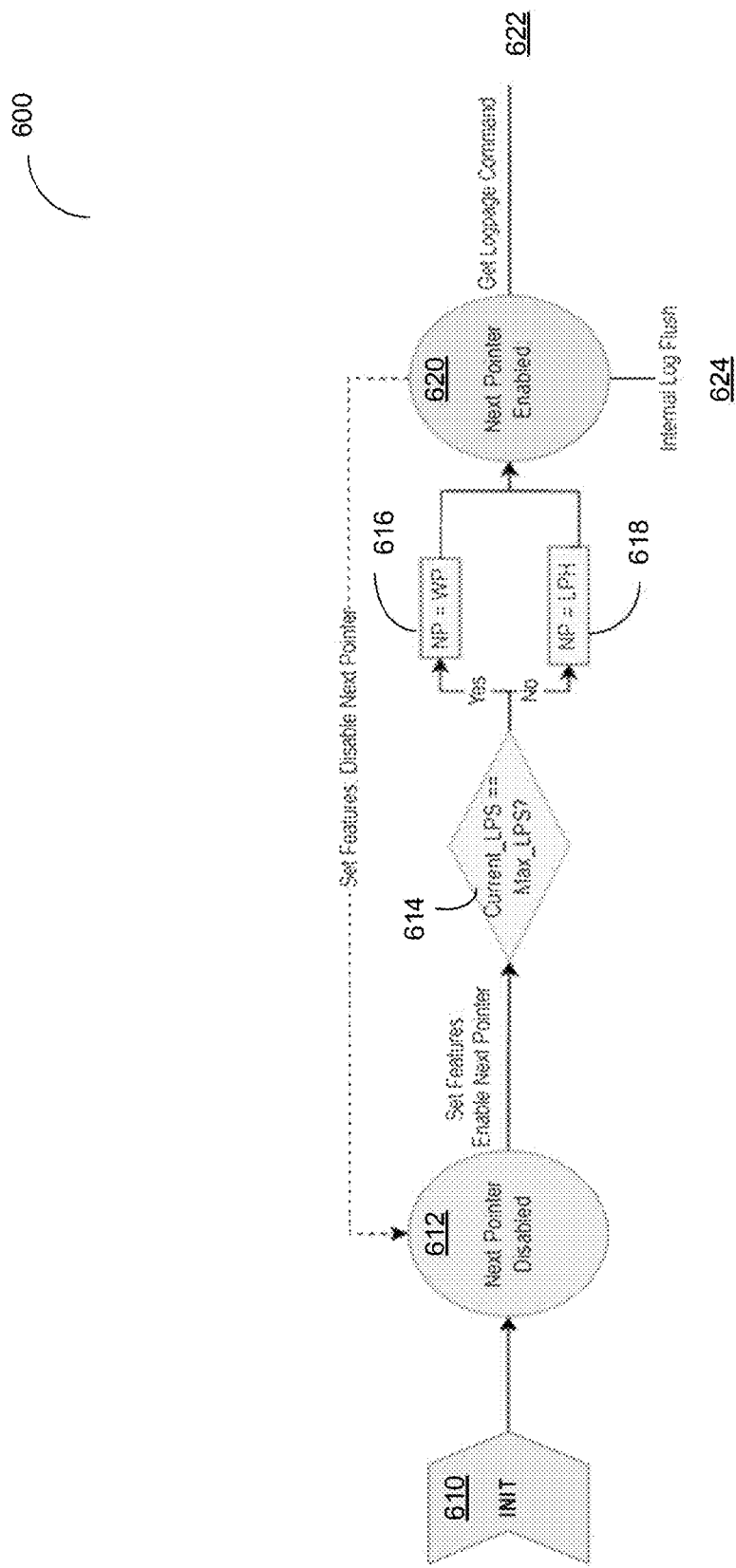
FIGS. 6A-6C schematically illustrate an example workflow 600 of internal log management implemented by a memory controller operating in accordance with aspects of the present disclosure.
Figure 6B:
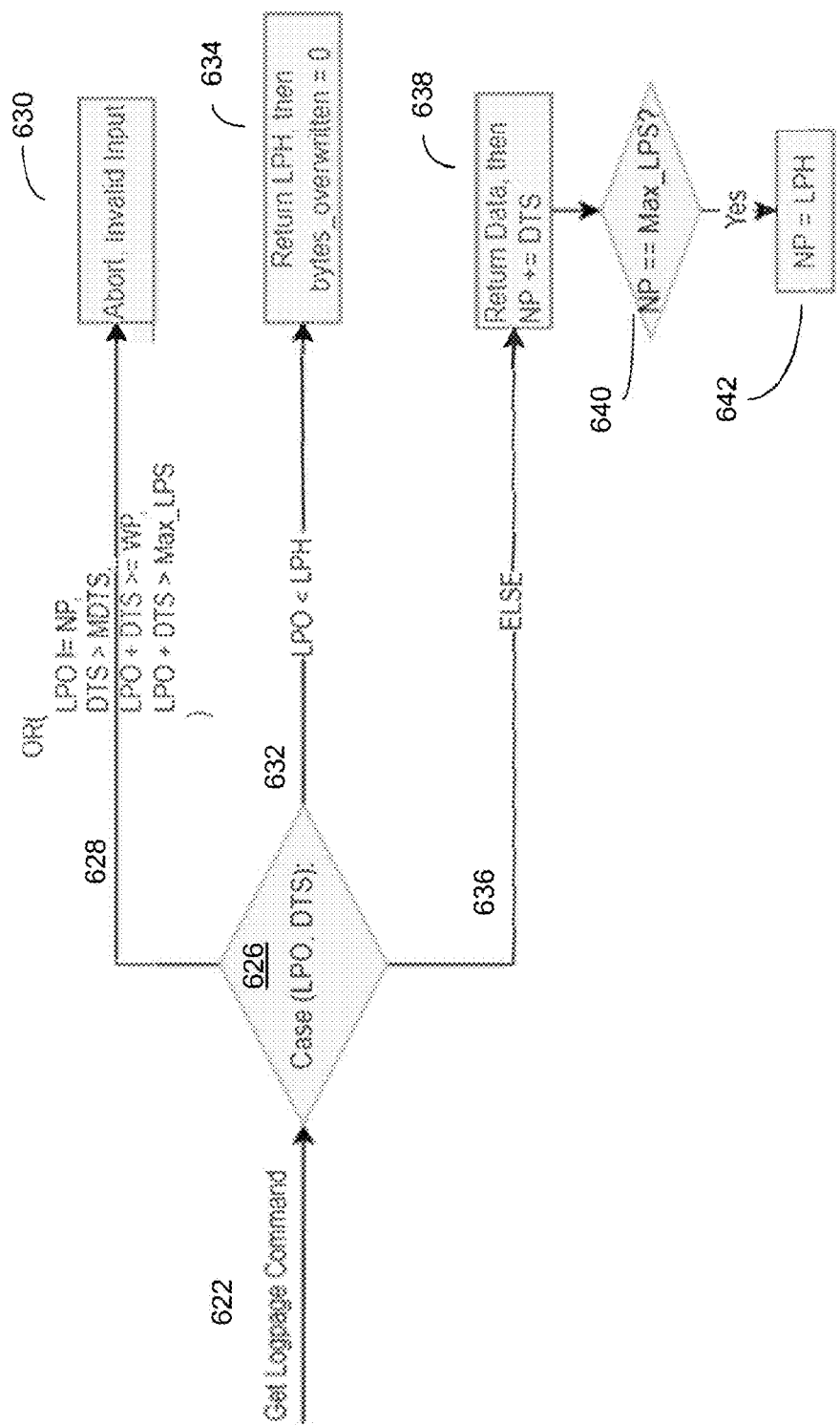
Figure 6C:
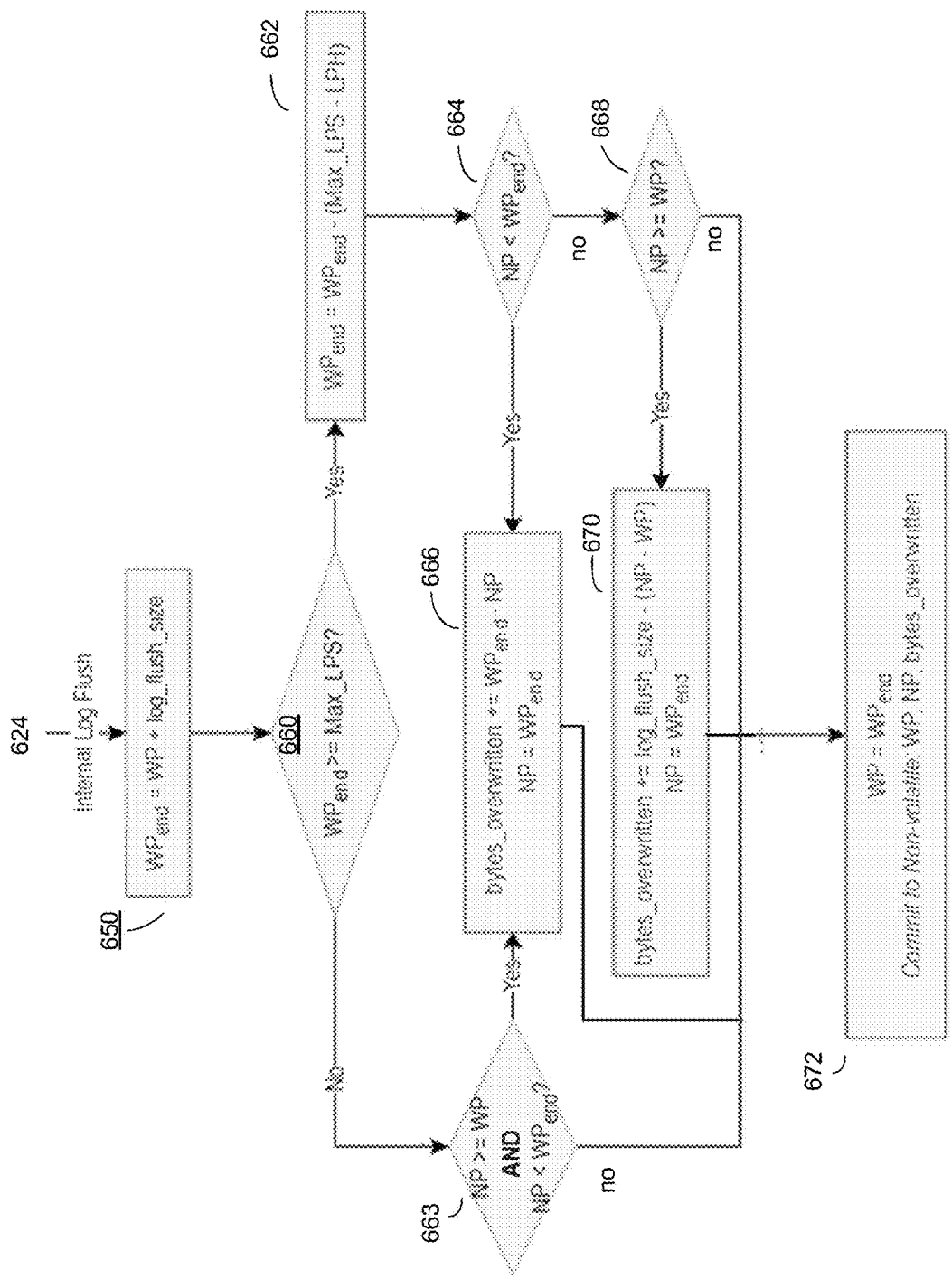

FIGS. 6A-6C schematically illustrate an example workflow 600 of internal log management implemented by a memory controller operating in accordance with aspects of the present disclosure. The workflow 600 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, workflow 600 may be performed by a single processing thread. Alternatively, workflow 600 may be performed by two or more processing threads, each thread executing one or more individual functions, routines, subroutines, or operations of the workflow. In an illustrative example, the processing threads implementing workflow 600 may be synchronized (e.g., using semaphores, critical sections, and/or other thread synchronization mechanisms). Alternatively, the processing threads implementing workflow 600 may be executed asynchronously with respect to each other. In some embodiments, the workflow 600 is performed by the memory sub-system controller 115 and/or the local media controller 135 of FIG. 1. Operations of the workflow 600 can be specified by a sequence of command codes, which the processing logic can retrieve from a dedicated storage location. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

As schematically illustrated by FIG. 6A, at operation 610, the processing logic (e.g., a memory sub-system controller) initializes the log management workflow (e.g., as a part of the power-up sequence).

At operation 612, the advanced pointer management functionality is disabled.

Responsive to determining that the advanced pointer management functionality should be enabled (e.g., based on the corresponding firmware setting), at operation 614 the current log page size (Current_LPS) is compared to the maximum page size (Max_LPS). Responsive to determining, at operation 614 that the current log page size is equal to the maximum page size, the retrieval pointer (NP) is set to match the write pointer (WP) at operation 616; otherwise, the retrieval pointer is set to match the log page header size at operation 618.

At operation 620, the advanced pointer management functionality is enabled. Responsive to receiving, at operation 620, a host-initiated log retrieval command, the processing continues at operation 622, as described herein below with reference to FIG. 6B. Responsive to receiving, at operation 620, a controller-initiated log flush command, the processing continues at operation 624, as described herein below with reference to FIG. 6C.

As schematically illustrated by FIG. 6B, at operation 622 the processing logic receives a host-initiated log retrieval command. In an illustrative example, the command may have one or more parameters, including the data transfer size (DTS) and the log page offset (LPO), which is expected to match the write pointer (WP) maintained by the controller. The data transfer size specifies the amount of log data (e.g., in bytes) to be transferred to the host. The log page offset specifies the starting offset of the log data to be retrieved from the log buffer and thus is expected to match the log retrieval pointer maintained by the controller.

At operation 622, the processing logic validates the command parameters. The validation conditions are schematically illustrated by branch 628, which compares the command parameters to various internal parameters associated with the advanced pointer management functionality. In an illustrative example, the log retrieval command is found to be invalid if the log page offset (LPO) specified by the command does not match the current log retrieval pointer (NP) 410A-410N of FIG. 4 maintained by the controller. In another illustrative example, the log retrieval command is found to be invalid if the data transfer size (DTS) specified by the command exceeds a predefined maximum data transfer size (MDTS). In another illustrative example, the log retrieval command is found to be invalid if the sum of the log page offset (LPO) specified by the command and the data transfer size (DTS) specified by the command exceeds or is equal to the current write pointer (WP) maintained by the controller. In another illustrative example, the log retrieval command is found to be invalid if the sum of the log page offset (LPO) specified by the command and the data transfer size (DTS) specified by the command exceeds a predefined maximum log page size (Max_LPS). Should any of the validation conditions fail, the processing logic, at operation 630, returns to the host an error code indicating an invalid input.

Responsive to successfully validating the log retrieval command, the processing logic, at branch 632, compares the log page offset (LPO) specified by the command to the predefined size of the log page header (LPH). Responsive to determining that the log page offset (LPO) specified by the command is below the predefined size of the log page header (LPH), the processing logic, at operation 634, returns the contents of the log page header to the host; upon successfully transmitting the contents of the log page header to the host, the processing logic resets to zero an internal variable storing the number of bytes overwritten. The workflow may then loop back to operation 620 to receive a subsequent command.

Conversely, responsive to determining that the log page offset (LPO) specified by the command exceeds or is equal to the predefined size of the log page header (LPH), the processing logic, at operation 638, returns the requested log data to the host and advances the log retrieval pointer (NP) by the host-specified data transfer size. Then, responsive to determining, at operation 640, that the log retrieval pointer (NP) has reached the predefined maximum log page size (Max_LPS), the log retrieval pointer (NP) is reset, at operation 642, to the value of the log page header (LPH) size. The workflow may then loop back to operation 620 to receive a subsequent command.

As schematically illustrated by FIG. 6C, at operation 624 the processing logic receives a controller-initiated log flush command. In an illustrative example, the command may have several parameters, including the size of the log data to be flushed (log_flush_size).

At operation 650, the processing logic increments the current write pointer (WP) by the size of the log data to be flushed flush (log_flush_size) thus computing the new value of the write pointer (WP_end). The processing continues at operation 660, which compares the new value of the write pointer (WP_end) to the predefined maximum log page size (Max_LPS).

Responsive to determining, at operation 660, that the new value of the write pointer (WP_end) has reached or exceeded the predefined maximum log page size (Max_LPS), the processing logic, at operation 662, wraps the write pointer around the end of the log buffer by subtracting, from the new write pointer (WP_end), the difference between the predefined maximum log page size (Max_LPS) and the log page header (LPH) size.

Responsive to determining, at operation 664, that the log retrieval pointer (NP) has not yet reached the updated write pointer (WP_end), the processing logic, at operation 666, increments the number of bytes overwritten by the difference between the updated write pointer (WP_end) and the log retrieval pointer (NP). Thereafter, the log retrieval pointer (NP) is set to match the updated write pointer (WP_end). The processing then continues at operation 672.

Conversely, responsive to determining, at operation 664, that the log retrieval pointer (NP) has reached or exceeded the updated write pointer (WP_end), the processing logic, at operation 668, compares the log retrieval pointer (NP) to the current (pre-updated) write pointer (WP).

Responsive to determining, at operation 668, that the log retrieval pointer (NP) exceeds or is equal to the current (pre-updated) write pointer (WP), the processing logic, at operation 670, increments the number of bytes overwritten by the size of the log data to be flushed (log_flush_size) reduced by the difference between the log retrieval pointer (NP) and the current (pre-updated) write pointer (WP). Thereafter, the log retrieval pointer (NP) is set to match the updated write pointer (WP_end). The processing then continues at operation 672.

Conversely, responsive to determining, at operation 668, that the log retrieval pointer (NP) has not yet reached the current (pre-updated) write pointer (WP), the processing continues at operation 672.

Referring again to the comparison performed at operation 660, if the new value of the write pointer (WP_end) has not yet reached the predefined maximum log page size (Max_LPS), the processing logic, at operation 663, compares the log retrieval pointer (NP) to the write pointer (WP) and to the updated write pointer (WP_end). If the log retrieval pointer (NP) exceeds or is equal to the write pointer (WP) and is less than the updated write pointer (WP_end), the processing logic, at operation 666, increments the number of bytes overwritten by the difference between the updated write pointer (WP_end) and the log retrieval pointer (NP). Thereafter, the log retrieval pointer (NP) is set to match the updated write pointer (WP_end). The processing then continues at operation 672.

Conversely, responsive to determining, at operation 663, that the log retrieval pointer (NP) is less than the write pointer (WP) and exceeds or is equal the updated write pointer (WP_end), the processing continues at operation 672.

At operation 672, the processing logic sets the write pointer (WP) to match the updated write pointer (WP_end). Thereafter, the current values of the write pointer (WP), log retrieval pointer (NP), and the bytes overwritten are stored to a non-volatile memory. The workflow may then loop back to operation 620 to receive a subsequent command.

Figure 7:
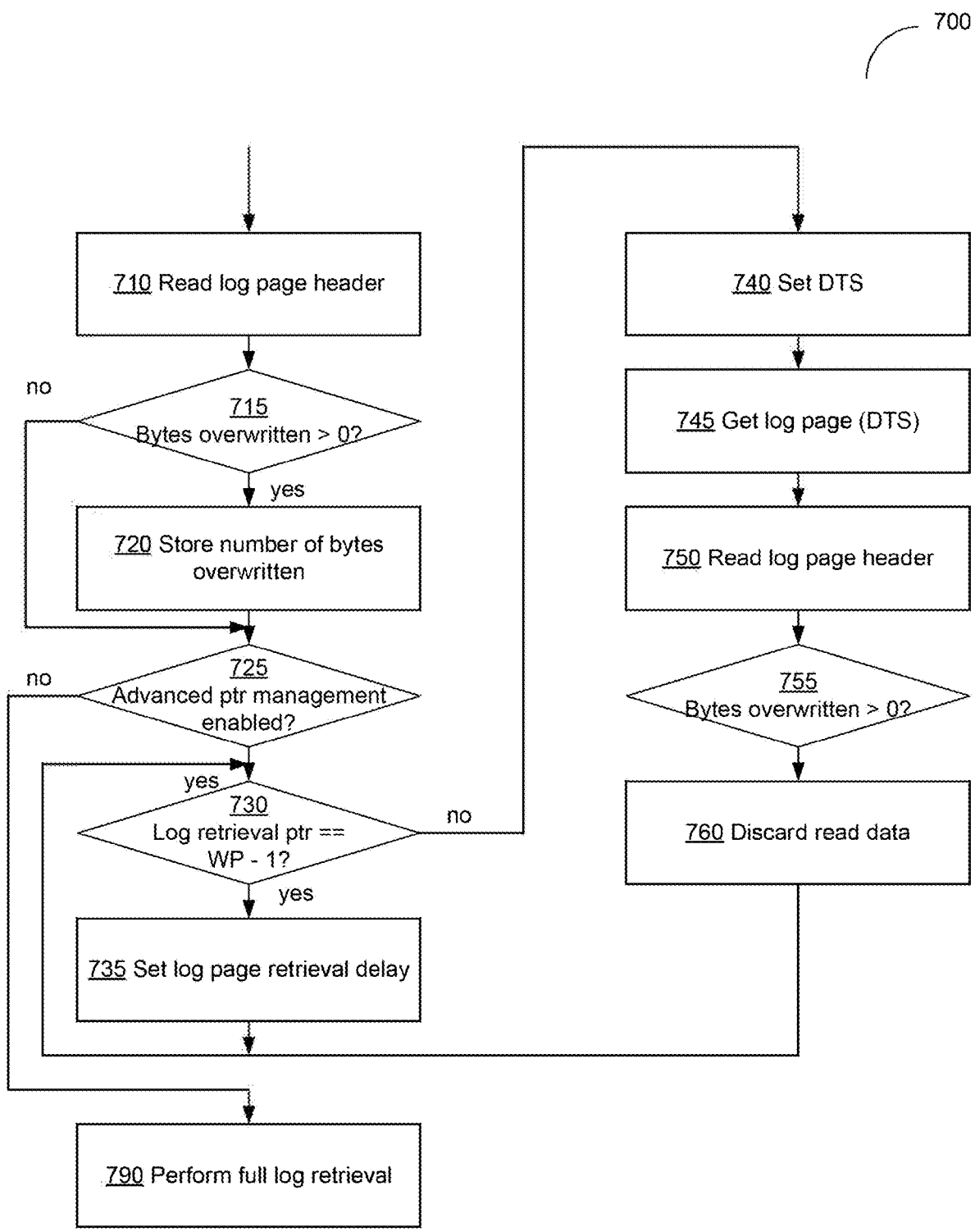
FIG. 7 schematically illustrate an example workflow 700 of memory sub-system log retrieval implemented by a host system operating in accordance with aspects of the present disclosure.

FIG. 7 schematically illustrate an example workflow 700 of memory sub-system log retrieval implemented by a host system operating in accordance with aspects of the present disclosure. The workflow 700 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, workflow 700 may be performed by a single processing thread. Alternatively, workflow 700 may be performed by two or more processing threads, each thread executing one or more individual functions, routines, subroutines, or operations of the workflow. In an illustrative example, the processing threads implementing workflow 700 may be synchronized (e.g., using semaphores, critical sections, and/or other thread synchronization mechanisms). Alternatively, the processing threads implementing workflow 700 may be executed asynchronously with respect to each other. In some embodiments, the workflow 700 is performed by the host system 120 of FIG. 1. Operations of the workflow 700 can be specified by a sequence of command codes, which the processing logic can retrieve from a dedicated storage location. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 710, the host reads the log page header (e.g., by transmitting an appropriate command to the memory sub-system) and retrieves the values of the write pointer (WP), log retrieval pointer (NP), the number of bytes overwritten, and the advanced pointer management flag indicating whether the advanced pointer management functionality is enabled or disabled.

Responsive to determining, at operation 715, that the number of bytes overwritten exceeds zero, the host, at operation 720, stores the number of bytes overwritten in association with a timestamp and other relevant information.

Responsive to determining, at operation 725, that the advanced pointer management functionality is enabled, the host, in a cycle, performs the advanced log retrieval operations 730-760; otherwise, the method branches to operation 790.

Responsive to determining, at operation 730, that the host-maintained log retrieval pointer matches the write pointer decremented by one, the host, at operation 735, sets the log page read delay to a predefined value and jumps to the next iteration of the cycle 730-760; otherwise, at operation 740, the host sets the data transfer size (DTS) to the minimum of the following: (i) application-specific data transfer size; (ii) minimum DTS value; and (iii) the DTS value computed as follows: if the write pointer (WP) exceeds the retrieval pointer (NP), the DTS value is the difference between the write pointer and the retrieval pointer; otherwise, the DTS value is the difference between the maximum log page size (LPS) and the retrieval pointer (NP).

At operation 745, the host issues a get log page command to the memory sub-system. The parameters of the command may include the log page offset equal to the retrieval pointer (NP), the data transfer size (DTS) computed at operation 740, and a log-specific parameter (LSP) set to a predefined value (e.g., 1) indicating that the device will freeze the log content, i.e., prevent internal log flushes from occurring while the Get Log Page command is being processed, in order to minimize the risk of reading data that may be changing at the same time.

At operation 750, the host re-reads the log page header (e.g., by transmitting an appropriate command to the memory sub-system) and retrieves the updated values of the write pointer (WP), log retrieval pointer (NP), and the number of bytes overwritten.

Responsive to determining, at operation 755, that the number of bytes overwritten exceeds zero, the host, at operation 760, discards the data read in response to the get log page command issued at operation 745 and stores the number of bytes overwritten in association with a timestamp and other relevant information. The method then loops back to operation 730.

Responsive to determining, at operation 725, that the advanced pointer management functionality is disabled, the host, at operation 790, performs the full log retrieval by issuing an appropriate command(s) to the memory sub-system.

Figure 8:
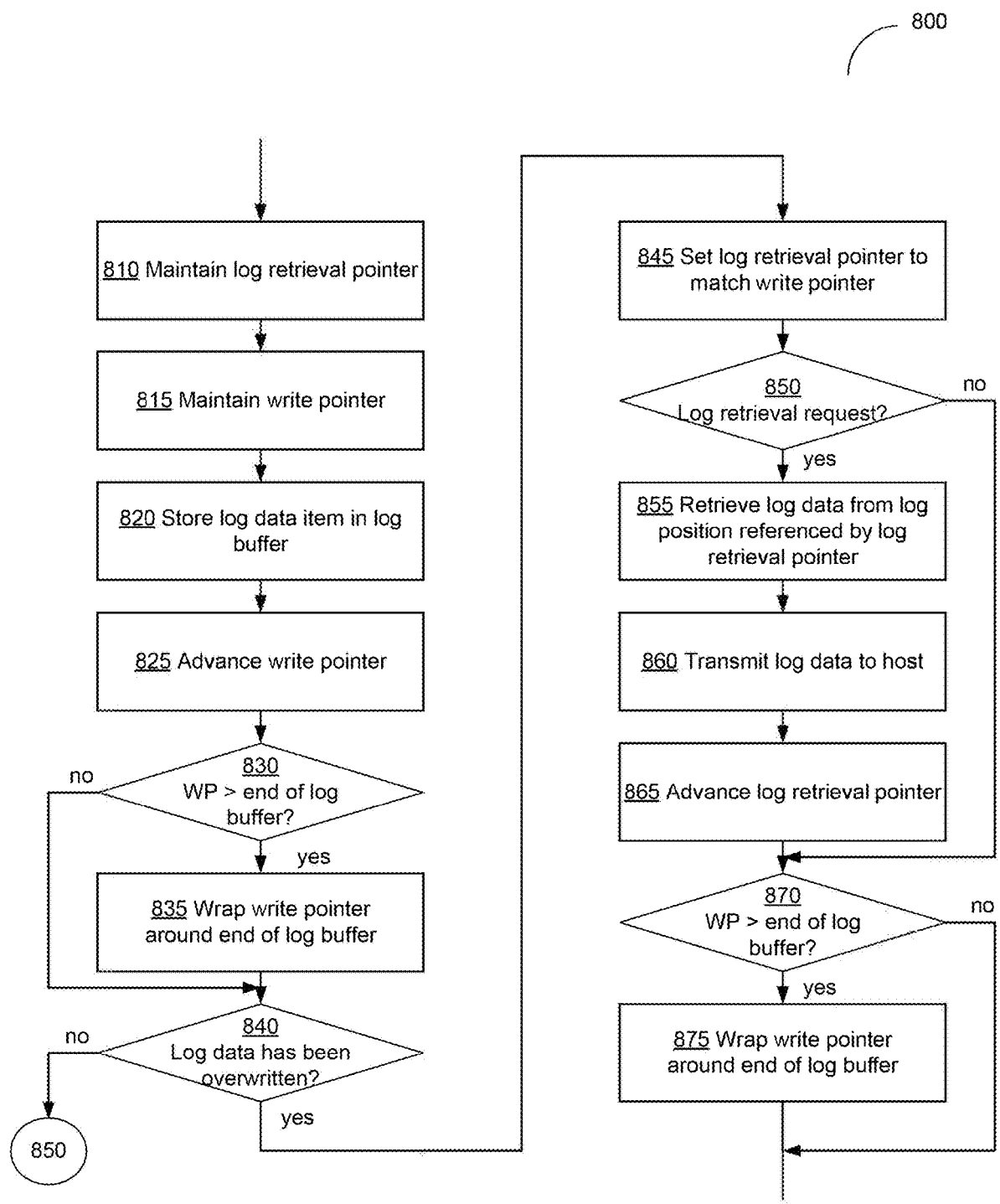
FIG. 8 schematically illustrates an example method 800 of internal log management implemented by a memory controller operating in accordance with aspects of the present disclosure.

FIG. 8 schematically illustrates an example method 800 of internal log management implemented by a memory controller operating in accordance with aspects of the present disclosure. The method 800 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. In some embodiments, the method 800 is performed by the memory sub-system controller 115 and/or the local media controller 135 of FIG. 1. Operations of the method 800 can be specified by a sequence of command codes, which the processing logic can retrieve from a dedicated storage location. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

As schematically illustrated by FIG. 8, at operation 810, the processing logic (e.g., a memory sub-system controller) maintains a write pointer referencing the position of the next data item to be written to a log buffer, which may reside on a memory device managed by the controller implementing the method. In some implementations, the log buffer may occupy a contiguous reserved range of physical addresses. In an illustrative example, the write pointer may specify a physical address within the reserved range of physical addresses. In another illustrative example, the write pointer may specify a byte position within the log buffer (e.g., the byte offset from the starting address of the buffer) and may be translated to a corresponding physical address by the controller.

At operation 815, the processing logic maintains a log retrieval pointer referencing the next data retrieval position within the log buffer, as described in more detail herein above.

At operation 820, the processing logic stores, at the log buffer position specified by the write pointer, a log data item reflecting the state of the memory sub-system. Information stored by the logs may include, e.g., error messages, event data, media endurance data, other device health data, etc., as described in more detail herein above.

At operation 825, the processing logic advances the write pointer by the size of the log data item that has been added to the log by operation 820, as described in more detail herein above.

Responsive to determining, at operation 830, that the write pointer exceeds an end of the log buffer, the processing logic, at operation 835, wraps the write pointer around the end of the log buffer. Wrapping the write pointer around the end of the log buffer may involve computing the new value of the WRITE pointer, by adding, modulo size of the log buffer, the size of the log data item that has been added to the log by operation 820 to the current value of the write pointer. In other words, the new value of the write pointer would be equal to the remainder of division of the sum of the size of the log data item and the current value of the write pointer by the size of the log buffer.

Responsive to determining, at operation 840, that at least a part of log data has been overwritten in the log buffer by the log write operation 820, the processing logic, at operation 845, sets the log retrieval pointer to match the write pointer, as described in more detail herein above.

Responsive to receiving, at operation 850, a log retrieval request initiated by the host, the processing continues at operation 855; otherwise, the processing continues at operation 870.

At operation 855, the processing logic retrieves the log data starting from the log buffer position referenced by the log retrieval pointer. The size of the retrieved log data may be less than or equal to the amount of log data specified by the log retrieval request. In some implementations, responsive to receiving the log retrieval request, the processing logic may validate one or more parameters of the request, as described in more detail herein above.

At operation 860, the processing logic transmits the retrieved log data to the host. In some implementations, the processing logic may return to the host the size of the overwritten log data, as described in more detail herein above.

At operation 865, the processing logic advances the log retrieval pointer by the size of the retrieved log data, as described in more detail herein above.

Responsive to determining, at operation 870, that the log retrieval pointer exceeds the end of the log buffer, the processing logic, at operation 875, wraps the log retrieval pointer around the end of the log buffer. Wrapping the log retrieval pointer around the end of the log buffer may involve computing the new value of the log retrieval pointer, by adding, modulo size of the log buffer, the size of the retrieved log data to the current value of the log retrieval pointer. In other words, the new value of the log retrieval pointer would be equal to the remainder of division of the sum of the size of the retrieved log data and the current value of the log retrieval pointer by the size of the log buffer.

Figure 9:
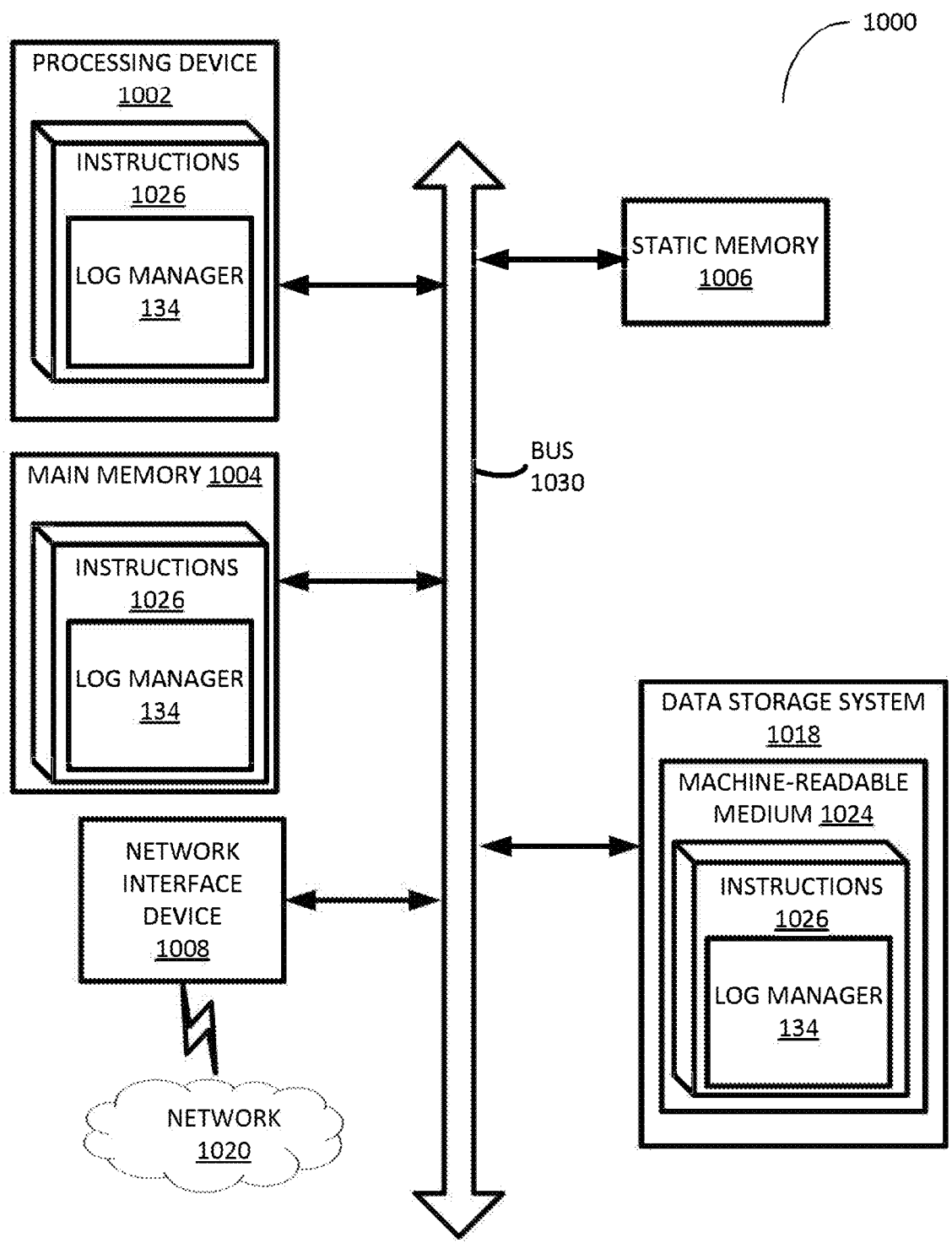
FIG. 9 illustrates an example machine of a computer system within which a set of instructions, for causing the machine to perform any one or more of the methodologies discussed herein, can be executed.

FIG. 9 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to perform operations corresponding to log manager 134 of FIG. 1, including workflows and methods 600, 700, and 800). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1009 to communicate over the network 1020.

The data storage system 1018 can include a machine-readable storage medium 1024 (also known as a computer-readable medium, such as a non-transitory computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to programming manager 134 of FIG. 1, including workflows and methods 600, 700, and 800. While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

All of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
    one or more memory devices; and
    a controller coupled to the one or more memory devices, the controller to perform operations comprising:
        maintaining a write pointer referencing a next data item position within a log buffer residing on a memory device of the one or more memory devices;
        maintaining a log retrieval pointer referencing a data retrieval position within the log buffer;

storing, at a log buffer position specified by the write pointer, a data item reflecting a state of the system;

advancing the write pointer by a size of the data item;

responsive to determining that the write pointer exceeds an end of the log buffer, wrapping the write pointer around the end of the log buffer;

responsive to receiving, from a host, a log retrieval request, retrieving log data starting from the position within the log buffer referenced by the log retrieval pointer, wherein the size of the retrieved log data is less than or equal to an amount of log data specified by the log retrieval request;

transmitting the retrieved log data to the host;

advancing the log retrieval pointer by a size of the retrieved log data;

responsive to determining that the log retrieval pointer exceeds the end of the log buffer, wrapping the log retrieval pointer around the end of the log buffer.

2. The system of claim 1, wherein the operations further comprise:

validating a parameter of the log retrieval request.

3. The system of claim 1, wherein wrapping the log retrieval pointer around the end of the log buffer further comprises:

setting the log retrieval pointer to a new position within the log buffer, wherein the new position is computed by addition, modulo size of the log buffer, of the log retrieval pointer and the size of the retrieved log data.

4. The system of claim 1, wherein wrapping the write pointer around the end of the log buffer further comprises:

setting the write pointer to a new position within the log buffer, wherein the new position is computed by addition, modulo size of the log buffer, of the write pointer and the size of the data item.

5. The system of claim 1, wherein the operations further comprise:

returning a size of log data that has been overwritten in the log buffer by one or more log write operations.

6. The system of claim 1, wherein the operations further comprise:

responsive to determining that a part of log data has been overwritten in the log buffer by one or more log write operations, setting the log retrieval pointer to match the write pointer.

7. A computer-readable non-transitory storage medium comprising executable instructions that, when executed by a controller of a system comprising one or more memory devices, cause the controller to perform operations, comprising:

maintaining a write pointer referencing a next data item position within a log buffer residing on a memory device of the one or more memory devices;

maintaining a log retrieval pointer referencing a data retrieval position within the log buffer;

storing, at a log buffer position specified by the write pointer, a data item reflecting a state of the system;

advancing the write pointer by a size of the data item;

responsive to determining that the write pointer exceeds an end of the log buffer, wrapping the write pointer around the end of the log buffer;

responsive to receiving, from a host, a log retrieval request, retrieving log data starting from the position within the log buffer referenced by the log retrieval pointer, wherein the size of the retrieved log data is less than or equal to an amount of log data specified by the log retrieval request;

transmitting the retrieved log data to the host;

advancing the log retrieval pointer by a size of the retrieved log data;

responsive to determining that the log retrieval pointer exceeds the end of the log buffer, wrapping the log retrieval pointer around the end of the log buffer.

8. The computer-readable non-transitory storage medium of claim 7, wherein the operations further comprise:

validating a parameter of the log retrieval request.

9. The computer-readable non-transitory storage medium of claim 7, wherein wrapping the log retrieval pointer around the end of the log buffer further comprises:

setting the log retrieval pointer to a new position within the log buffer, wherein the new position is computed by addition, modulo size of the log buffer, of the log retrieval pointer and the size of the retrieved log data.

10. The computer-readable non-transitory storage medium of claim 7, wherein wrapping the write pointer around the end of the log buffer further comprises:

setting the write pointer to a new position within the log buffer, wherein the new position is computed by addition, modulo size of the log buffer, of the write pointer and the size of the data item.

11. The computer-readable non-transitory storage medium of claim 7, wherein the operations further comprise:

returning a size of log data that has been overwritten in the log buffer by one or more log write operations.

12. The computer-readable non-transitory storage medium of claim 7, wherein the operations further comprise:

responsive to determining that a part of log data has been overwritten in the log buffer by one or more log write operations, setting the log retrieval pointer to match the write pointer.

13. A method, comprising:

maintaining, by a controller of a system comprising one or more memory devices, a write pointer referencing a next data item position within a log buffer residing on a memory device of the one or more memory devices;

maintaining a log retrieval pointer referencing a data retrieval position within the log buffer;

storing, at a log buffer position specified by the write pointer, a data item reflecting a state of the system;

advancing the write pointer by a size of the data item;

responsive to determining that the write pointer exceeds an end of the log buffer, wrapping the write pointer around the end of the log buffer;

responsive to receiving, from a host, a log retrieval request, retrieving log data starting from the position within the log buffer referenced by the log retrieval pointer, wherein the size of the retrieved log data is less than or equal to an amount of log data specified by the log retrieval request;

transmitting the retrieved log data to the host;

advancing the log retrieval pointer by a size of the retrieved log data;

responsive to determining that the log retrieval pointer exceeds the end of the log buffer, wrapping the log retrieval pointer around the end of the log buffer.

14. The method of claim 13, further comprising:

validating a parameter of the log retrieval request.

15. The method of claim 13, wherein wrapping the log retrieval pointer around the end of the log buffer further comprises:

setting the log retrieval pointer to a new position within the log buffer, wherein the new position is computed by addition, modulo size of the log buffer, of the log retrieval pointer and the size of the retrieved log data.

16. The method of claim 13, wherein wrapping the write pointer around the end of the log buffer further comprises:
    setting the write pointer to a new position within the log buffer, wherein the new position is computed by addition, modulo size of the log buffer, of the write pointer and the size of the data item.

17. The method of claim 13, further comprising:
    returning a size of log data that has been overwritten in the log buffer by one or more log write operations.

\* \* \* \* \*